United States Patent [19]  
Farrow et al.

[11] 3,960,078  
[45] June 1, 1976

[54] PRINTING PROCESSES

[75] Inventors: Harold Frederick Farrow, Hitchin; Bernard Booth Rackstraw, High Wycombe, both of England

[73] Assignee: Encoline(Process)Limited, Slough, England

[22] Filed: Feb. 10, 1975

[21] Appl. No.: 548,176

[52] U.S. Cl. .............................. 101/150; 101/170
[51] Int. Cl.² ..................... B41N 1/06; B41F 1/00
[58] Field of Search .......... 101/170, 163, 150, 151, 101/395; 425/811, 125, 242 R

[56] References Cited
UNITED STATES PATENTS

| 2,765,494 | 10/1956 | Weingart | 425/811 |
| 2,766,484 | 10/1956 | Sanderson | 425/125 |
| 3,028,002 | 4/1962 | Nicolle | 425/812 |

Primary Examiner—J. Reed Fisher

[57] ABSTRACT

Intaglio Printing with a viscous fluid on to non-porous substrates using intaglio plates in which the image cavity is vented to the outside through non-return valve means, thus permitting the escape of air trapped between the non-porous substrate and the image cavity as well as excess fluid which is also restrained from being drawn back into the deposit on withdrawal of the plate. Particularly suitable for printing sealants on selected areas of gaskets.

7 Claims, 1 Drawing Figure

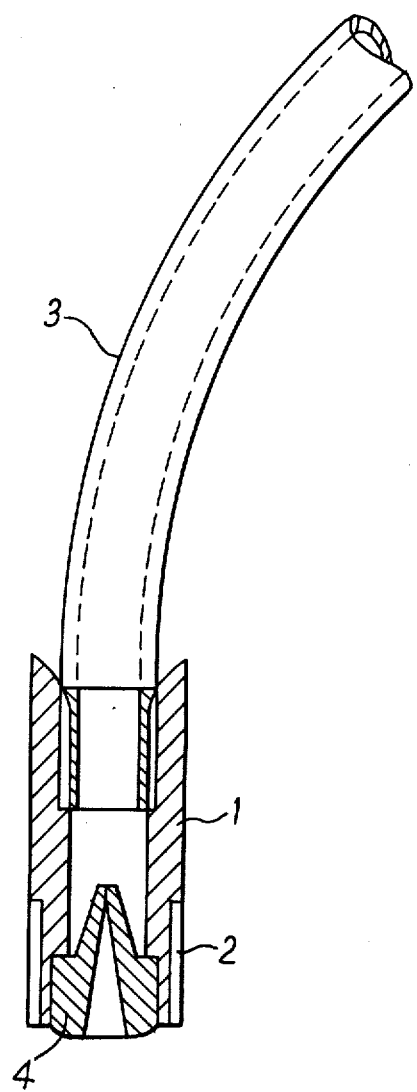

PRINTING PROCESSES

The present invention relates to printing processes using intaglio printing plates in which the image to be printed is engraved into one surface of the plate and the viscous liquid to be printed is fed to the engraved image through passages formed in the thickness of the plate. When the plate contacts the substrate to be printed, a cavity between the substrate and the engraved image on the plate is formed and the printing liquid is injected into this cavity to be deposited on selected areas of the substrate. When the substrate is, for example, paper it is sufficiently porous to permit the escape of air trapped in the cavity and expelled by the injection under pressure ink or other printing fluid. However, when the substrate is relatively non-porous, the trapped air cannot escape and the desired deposit cannot be put down satisfactorily. This is the case, for example, when manufacturing gaskets by depositing sealants, adhesives and the like on non-porous substrates by means of an intaglio printing process.

It is accordingly an object of the present invention to provide for the expulsion of air trapped between a non-porous substrate and an intaglio printing plate whilst retaining the desired controlled definition of deposit outline.

According to the present invention an intaglio printing plate for use in applying deposits of a viscous fluid on a non-porous substrate is provided with at least one air-bleed passsage communicating with the image engraved in the plate and provided with non-return valve means whereby in operation air trapped in the engraved cavity of the image between the substrate and the plate may escape, together with any excess fluid injected into the cavity, so that the latter is not added to the deposit on withdrawal of the plate.

The non-return valve means may be mechanical with a moveable valve member or may take a physical form such as a capillary to which a pressure constraint is applied.

The viscous fluid may be printing ink but with the present invention is more likely to be a sealant or an adhesive.

One preferred embodiment of the invention will now be described by way of example with reference to the accompanying drawing which shows a half section of a nonreturn or bleed valve for use in intaglio printing apparatus. The illustrated bleed valve was attached to the back of the intaglio printing plate, a hole of 0.013 inch (0.35 mm) diameter being drilled through the plate to connect the image cavity to the bleed valve. The hole is sufficiently fine to ensure retention of printing fluid by surface tension so preventing the fluid from falling back into the image cavity on removal of the plate following injection. The hole was tapped to receive the bleed valve which was formed in two parts. A body 1 of rigid polyethylene is provided at one end with an external thread 2 by means of which the valve is attached to the tapped hole in the plate. Into the other end of the body 1 is fitted an extension tube 3 to contain any excess printing fluid expelled in operation through the valve means. Within the screw-end of the body 1 is located a reed type valve 4 formed of resilient, plasticised PVC and designed to be self-closing to prevent reverse flow. The reed is of a strength such that it will open under the pressure generated in the image cavity by the injection of the viscous fluid.

In another preferred embodiment exemplifying the invention, the reed type valve was replaced by a capillary to which a reduced air pressure was applied. In operation, this arrangement worked in exactly the same way as the reed valve, allowing the escape of entrapped air from the cavity image together with a slight excess of viscous fluid and the fluid was also thereby restrained from returning to the image cavity when the plate was withdrawn. This apparatus was successfully used to apply sealants to selected areas on cylinder head gaskets.

The nature (shape and size) of the image to be deposited will determine whether an image cavity has to be provided with one or more than one bleed valve. The disposition and number of the non-return valve means will also depend on the configuration of the image but the valved intaglio printing plate of the invention also gives a measure of compensation for unequal image volumes fed by equal displacement injectors.

What is claimed is:

1. Intaglio printing apparatus for use in applying deposits of a viscous fluid on a nonporous substrate comprising an intaglio printing plate provided with at least one air-bleed passage communicating with an image engraved in the plate and provided with vent means for allowing air trapped in the engraved cavity of the image between the substrate and the plate to escape in response to increase in pressure by injection of said fluid into said cavity, together with any excess fluid injected into the cavity, so that the latter is not added to the deposit on withdrawal of the plate, said vent means comprising a nonreturn valve having surfaces acting to block flow of air and any excess fluid back into said cavity in response to reduction in the pressure in said cavity and enabling flow of air and any excess fluid therepast during injection of said fluid into said cavity.

2. Intaglio printing apparatus according to claim 1, wherein the non-return valve means comprises a mechanical device operating by means of a movable valve member.

3. Intaglio printing apparatus according to claim 2, wherein the non-return valve means is a reed type valve.

4. Intaglio printing apparatus according to claim 1, wherein the non-return valve means comprises a capillary to which a reduced pressure is applied.

5. Intaglio printing apparatus according to claim 1, wherein said air-bleed passage has a sufficiently small dimension to insure retention of the printing fluid by surface tension and prevention of the printing fluid from receding into the image cavity on withdrawal of said plate following injection.

6. Intaglio printing apparatus for use in applying deposits of a viscous fluid on a nonporous substrate comprising an intaglio printing plate provided with at least one air-bleed passage communicating with an image engraved in the plate and provided with a nonreturn valve means for allowing air trapped in the engraved cavity of the image between the substrate and the plate to escape, together with any excess fluid injected into the cavity, so that the latter is not added to the deposit on withdrawal of the plate, said nonreturn valve comprising a threaded body attached to said air-bleed passage in said plate, a tube inserted into one end of said body for containing any excess printing fluid expelled during printing, and a self-closing reed type valve contained within said body.

7. An intaglio printing process for applying deposits of a viscous fluid on a nonporous substrate comprising contacting an intaglio printing plate with said nonporous substrate, said plate being provided with at least one air-bleed passage communicating with an image engraved in said plate and provided with a nonreturn means in fluid communication with said passage, injecting fluid into said image engraved in said plate thereby causing an increase in pressure in the cavity formed between said image and said substrate, said increase in pressure simultaneously causing air trapped in said cavity to escape together with any excess fluid injected into said cavity through said passage and into said nonreturn means, and withdrawing said plate from said substrate thereby causing surfaces of said nonreturn means to block flow of air and any excess fluid back into said cavity.

* * * * *